(12) United States Patent
Okayama

(10) Patent No.: US 11,334,440 B2
(45) Date of Patent: May 17, 2022

(54) INFORMATION PROCESSING SYSTEM, INFORMATION PROCESSING APPARATUS, AND INFORMATION PROCESSING METHOD

(71) Applicant: CANON KABUSHIKI KAISHA, Tokyo (JP)

(72) Inventor: Noritsugu Okayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 16/825,992

(22) Filed: Mar. 20, 2020

(65) Prior Publication Data
US 2020/0310918 A1 Oct. 1, 2020

(30) Foreign Application Priority Data

Mar. 29, 2019 (JP) .............................. JP2019-068845

(51) Int. Cl.
*G06F 12/00* (2006.01)
*G06F 11/14* (2006.01)

(52) U.S. Cl.
CPC ...... *G06F 11/1451* (2013.01); *G06F 11/1443* (2013.01); *G06F 11/1469* (2013.01); *G06F 11/1471* (2013.01)

(58) Field of Classification Search
CPC ............. G06F 11/1451; G06F 11/1443; G06F 11/1469; G06F 11/1471; G06F 3/0646; G06F 3/0647

See application file for complete search history.

(56) References Cited

U.S. PATENT DOCUMENTS

2018/0349075 A1* 12/2018 Inoue ....................... G06F 8/63

FOREIGN PATENT DOCUMENTS

JP 2013-131168 A 7/2013

\* cited by examiner

*Primary Examiner* — Shawn X Gu
(74) *Attorney, Agent, or Firm* — Canon U.S.A., Inc. I.P. Division

(57) ABSTRACT

An information processing system including a first information processing apparatus including a unit configured to transmit information about the first information processing apparatus to a server, and a unit configured to cause a display to display a screen via which backup data to be imported to the first information processing apparatus is to be designated. The server including a unit configured to acquire identification information about some backup data, the identification information acquired based on the transmitted information and the some backup data including backup data about a second information processing apparatus different from the first information processing apparatus, from among a plurality of pieces of backup data about one or more information processing apparatuses managed by the server. The server transmit the identification information to the first information processing apparatus, and the screen provides information that is based on the identification information, and lists the some backup data.

22 Claims, 14 Drawing Sheets

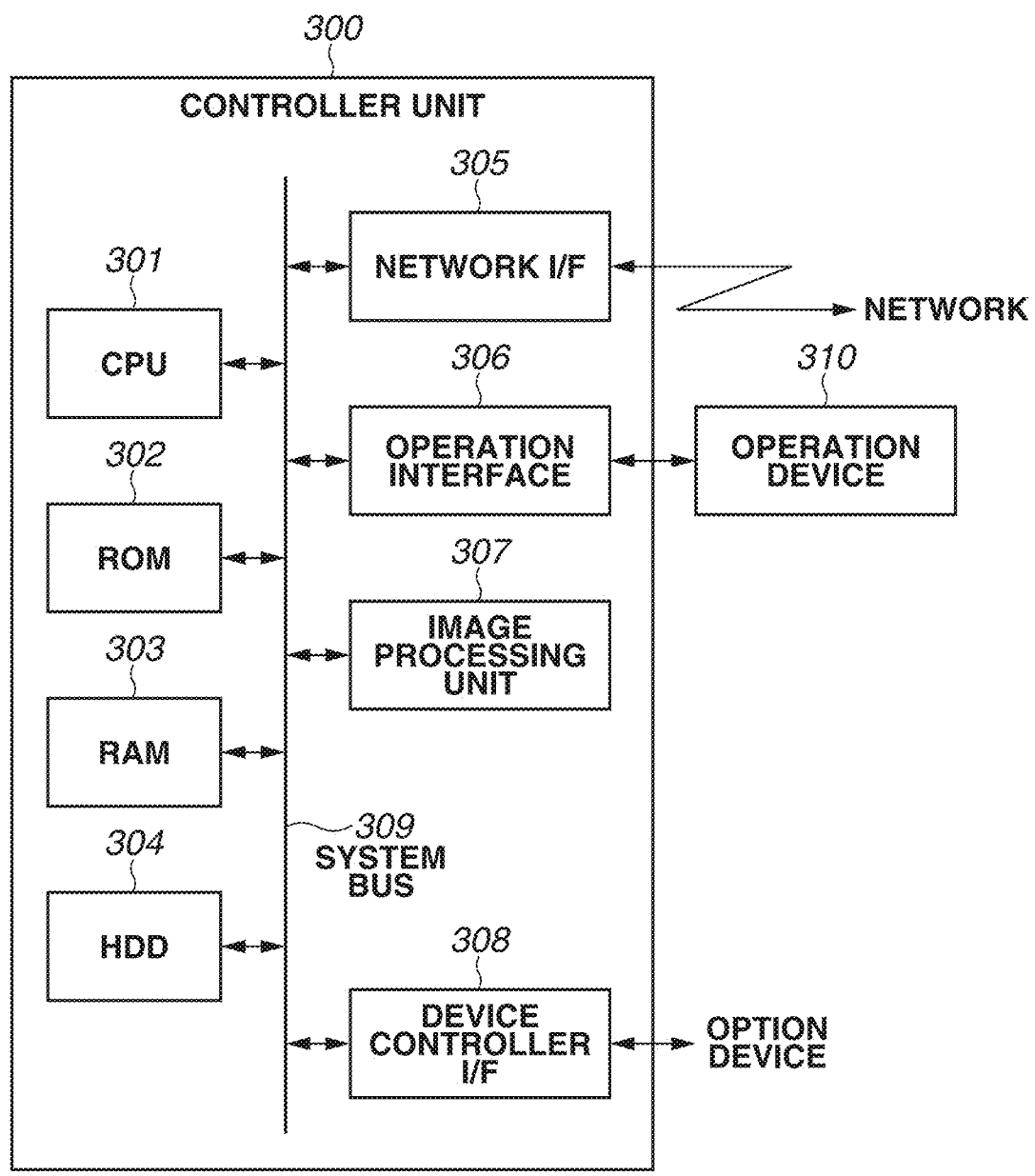

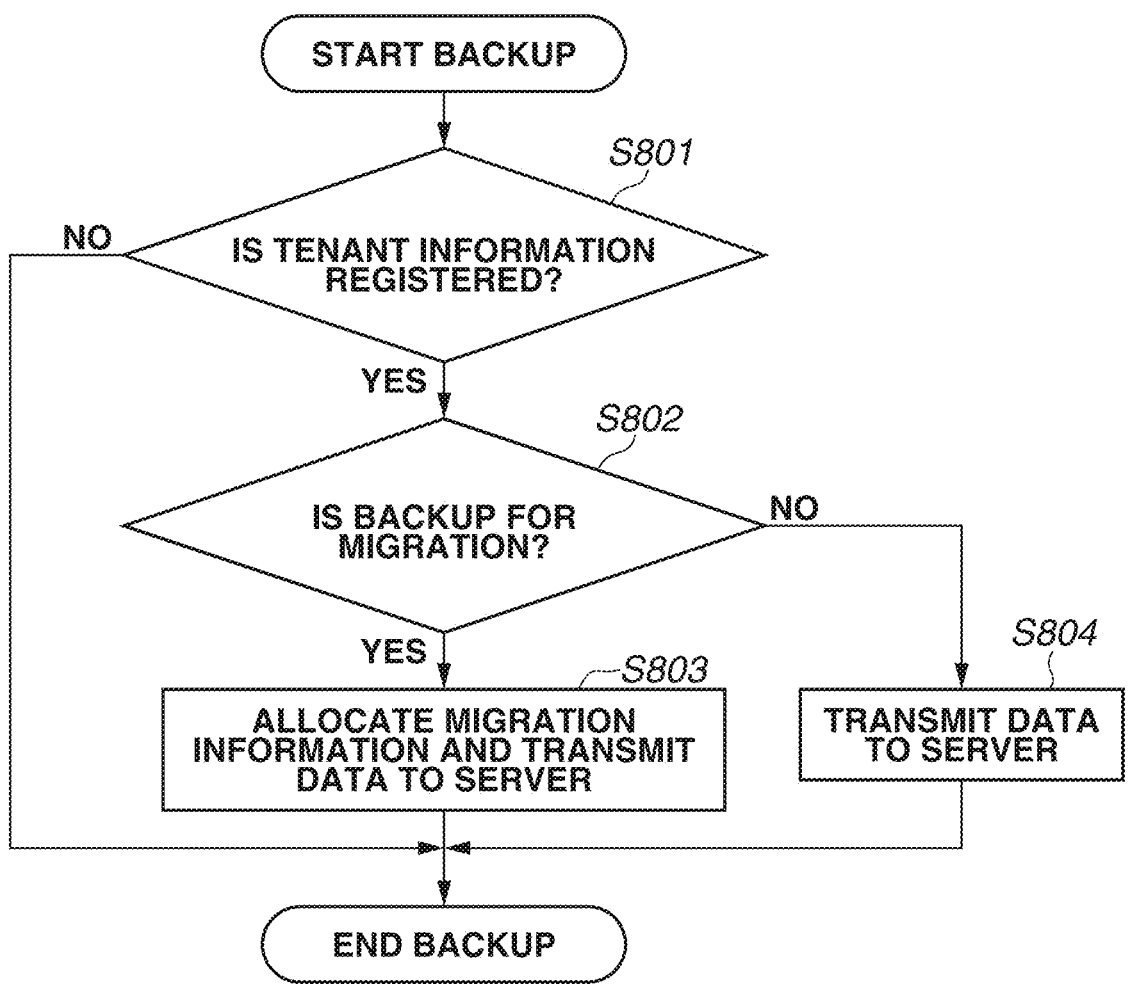

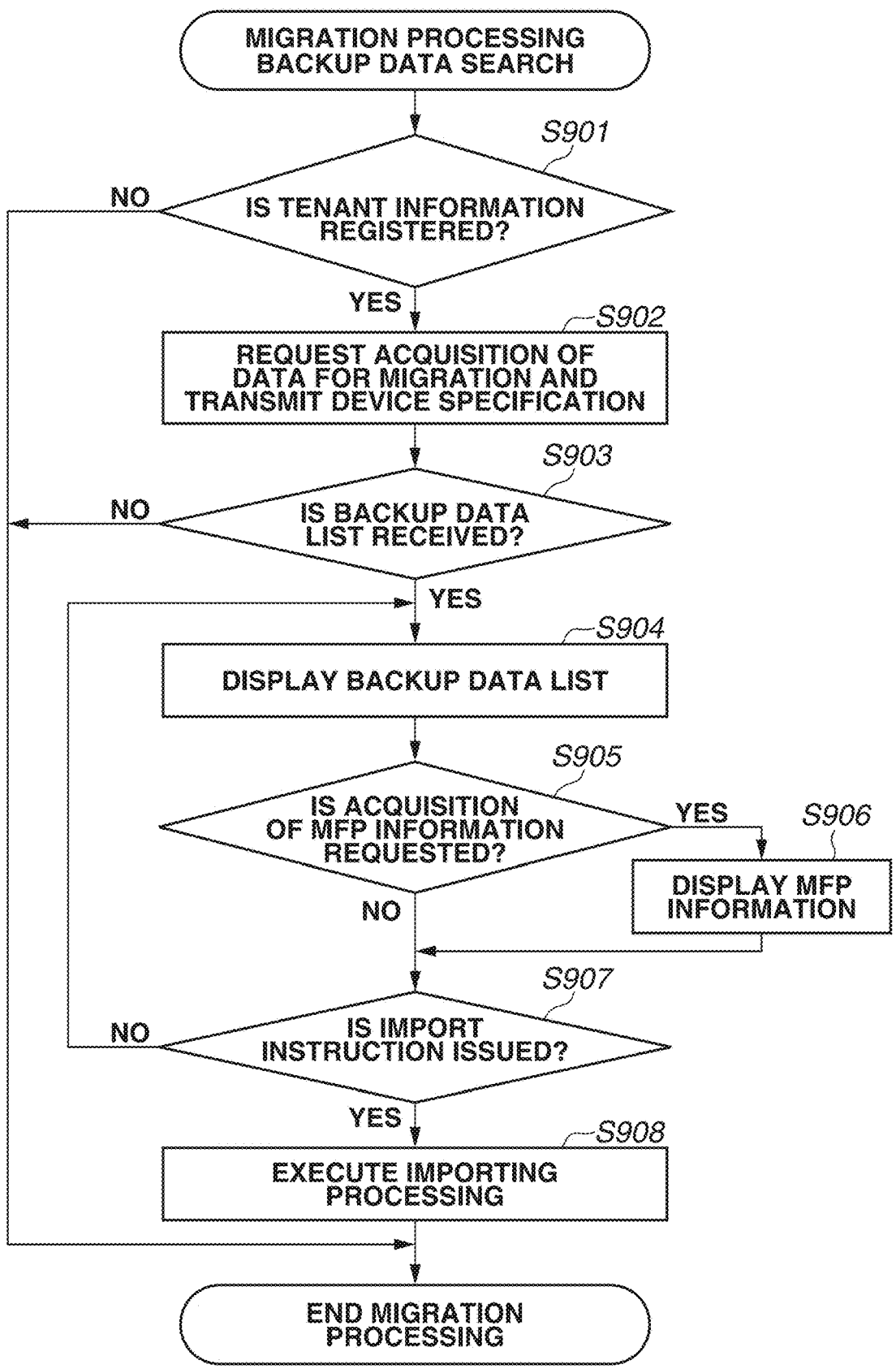

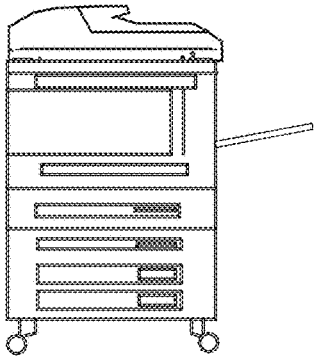

INFORMATION PROCESSING SYSTEM, INFORMATION PROCESSING APPARATUS, AND INFORMATION PROCESSING METHOD

BACKGROUND

Field

The present disclosure relates to a system for backing up data.

Description of the Related Art

Technology has been developed for providing a service (migration service) to back up data about an information processing apparatus onto an external apparatus, such as a cloud server, and importing the backed up data into another information processing apparatus. Such information processing apparatuses may be used as, for example, a printer, a facsimile, a scanner, or a multi-function peripheral (MFP) that includes functions of a printer, a facsimile, and a scanner.

A technique is known that imports backup data about an MFP that has been in use, into a new MFP. The technique is used to smoothly replace the MFP with the new MFP. Japanese Patent Application Laid-Open No. 2013-131168 discusses a technique for generating import data for each MFP based on backup data to thereby provide a flexible service.

SUMMARY

In a case where a plurality of pieces of data (e.g., backup data, and import data) is used as discussed in Japanese Patent Application Laid-Open No. 2013-131168, management of the data is likely to become complicated as the number of pieces of data increases. Thus, with such systems, an erroneous operation can occur, e.g., issuance of an import instruction using erroneous data.

In view of the above-described issue, various embodiments of the present disclosure are directed to providing an information processing system that excels in importing backup data from one information processing apparatus, into another information processing apparatus. In particular, various embodiments are directed to providing an information processing system capable of preventing issuance of an import instruction using erroneous data.

According to various embodiments of the present disclosure, an information processing system includes a first information processing apparatus including a display configured to display information, and at least one controller configured to transmit information about the first information processing apparatus to a server, and cause the display to display a screen via which backup data to be imported to the first information processing apparatus is to be designated. The server includes at least one controller configured to acquire identification information about some backup data, which includes backup data about a second information processing apparatus different from the first information processing apparatus, from among the plurality of pieces of backup data based on the transmitted information, and transmit the identification information to the first information processing apparatus. The screen provides information that is based on the identification information and lists the some backup data.

Further features will become apparent from the following description of exemplary embodiments with reference to the attached drawings.

BRIEF DESCRIPTION OF THE DRAWINGS

FIG. 3 is a block diagram illustrating a configuration of a controller unit of a multi-function peripheral (MFP) according to one embodiment.

FIG. 8 is a flowchart illustrating a backup process of the backup application according to one embodiment.

FIG. 9 is a flowchart illustrating a migration process (search by device specification) of the migration application according to one embodiment.

FIGS. 10A and 10B each illustrate an example of a search result of the migration application according to one embodiment. FIG. 10C illustrates a device configuration screen of the migration application according to one embodiment.

DESCRIPTION OF THE EMBODIMENTS

An exemplary embodiment of the present disclosure will be described below with reference to the drawings. Every element described below however is a mere example, and is not intended to limit the scope of the invention. An element may be replaced, added, or deleted within the scope of the invention.

<System>

Figure 1:
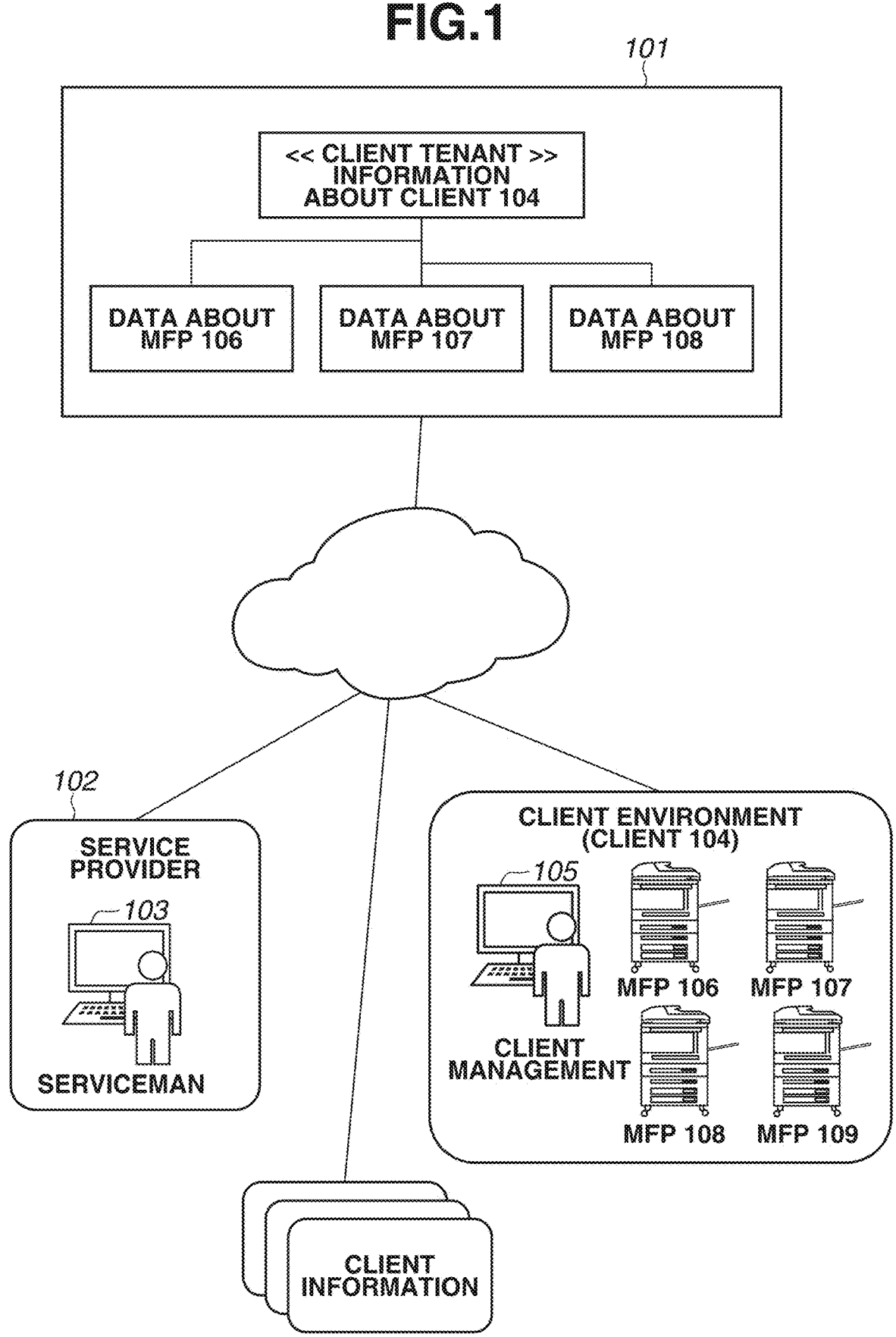
FIG. 1 illustrates a block diagram of a system configuration according to one embodiment.

FIG. 1 illustrates a configuration of a system according to an exemplary embodiment of the present disclosure. The system includes a server 101, a service provider 102, and a client 104.

The server 101 provides a service on a cloud system using one or more information processing apparatuses. The server 101 functions as a device management system. The device management system (the server 101) manages client information about a client to which the server 101 is to be provided, device information (e.g., device identification (ID), device type, and authentication information) about one or more multi-function peripherals (MFPs) of the client, and backup data about each MFP. In other words, the server 101 can manage a plurality of pieces of backup data.

The server 101 stores the backup data on a storage service that cooperates with the server 101. The backup data includes setting information about each MFP and a setting value of each application. These setting information are stored in a storage area of a hard disk drive (HDD), a solid state drive (SSD), or the like included in one or more MFPs owned by one or more management target clients. For example, the backup data may include print-related setting information, scan-related setting information, facsimile-related setting information, power-related setting information, sheet-related setting information, communication-related setting information, and display-related setting information. The backup data may further contain web browser-related setting information, address book-related information, user-related information, Bluetooth® Low Energy-related setting information, and near-field communication (NFC)-related setting information.

The server 101 provides a restoration function by distributing at least a part of the backed-up data to an MFP in response to a request from the MFP, in a case where the MFP has a storage trouble. As illustrated in FIG. 1, the server 101 includes a "client tenant" area including a separate data storage area for each client. The server 101 manages backup data about each of MFPs 106 to 108 owned by the client 104 in association in the client tenant area.

The service provider 102 is a service provider that provides a backup service to a client. A terminal 103, which is operated by an operator (e.g., serviceman who provides maintenance on MFPs) of the service provider 102, includes a web browser. The operator can thereby browse and operate a website provided by the server 101.

The client 104 receives a backup service for each MFP owned by the client 104. A client environment of the client 104 includes one or more MFPs on a local area network (LAN). FIG. 1 illustrates an example that includes the MFPs 106, 107, and 108. The MFPs 106 to 108 can communicate with the server 101 using authentication information issued after the client 104 enters into a contract with the server 101.

A terminal 105, which is operated by a client administrator of the client 104, includes a web browser and has a function of browsing a website provided by the server 101.

<Use Sequence>

Figure 14:
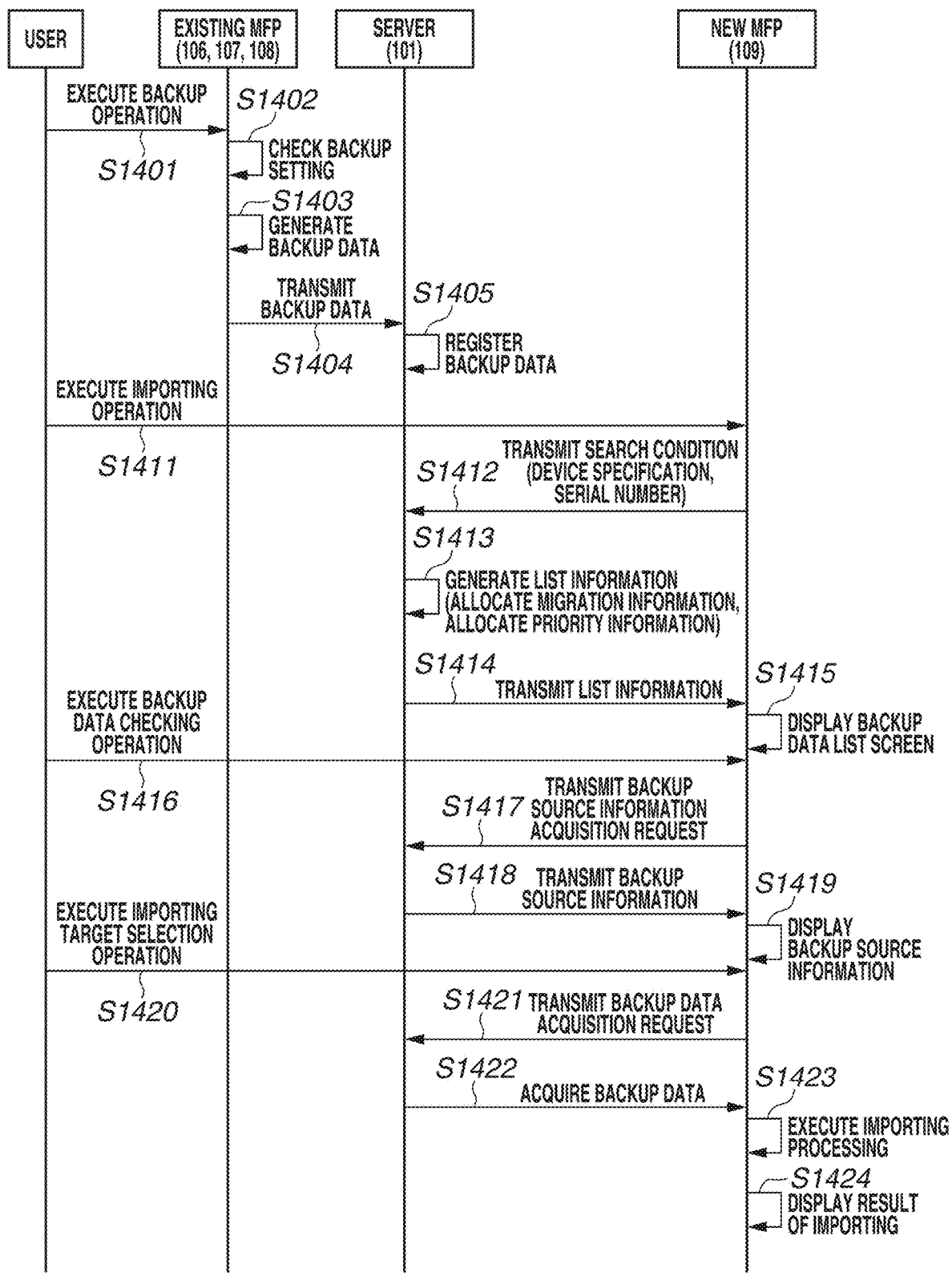
FIG. 14 illustrates a use sequence of the system according to one embodiment.

A use example of the system will be described. FIG. 14 illustrates a use sequence of the system.

In step S1401, the user executes a backup operation on the existing MFPs 106 to 108 when using the system. In step S1402, the MFPs 106 to 108 check details of the designated backup when the MFPs 106 to 108 receive a user operation. In step S1403, the MFPs 106 to 108 generate backup data based on the setting. In step S1404, the MFPs 106 to 108 then transmit the backup data to the server 101. In step S1405, the server 101 having received the backup data performs registration processing of the backup data. Along with the registration processing, the server 101 may transmit a backup result to the MFPs 106 to 108 so that the backup result is displayed on the MFPs 106 to 108.

Thereafter, in step S1411, an importing operation is executed on a new MFP 109. In step S1412, the MFP 109 having received a user operation transmits configuration information about the MFP 109 to the server 101, and requests backup data list information. In step S1413, the server 101 having received the request from the MFP 109 generates backup data list information based on the configuration information about the MFP 109. In step S1414, the server 101 transmits the generated backup data list information to the MFP 109. In step S1415, the MFP 109 displays a backup data list screen based on the backup data list information acquired from the server 101. In step S1416, the user performs a backup data checking operation on the MFP 109. In step S1417, an acquisition request is performed by the MFP 109. In step S1418, information transmission is performed by the server 101. In step S1419, the MFP 109 displays detailed information about the backup data. In step 1420, the user ends the display of the detailed information about the backup data, and selects backup data to be imported from the backup data list.

In step S1421, the MFP 109 transmits a selected backup data acquisition request to the server 101. In step S1422, the server 101 having received the request transmits the designated backup data to the MFP 109. In step S1423, the MFP 109 executes importing processing based on the received backup data. In step S1424, the MFP 109 displays an importing processing execution result.

As described above, in the present exemplary embodiment, the configuration information about the MFP 109 as a migration target is transmitted to the server 101 on which the backup data about the existing MFPs 106 to 108 is stored. The configuration information is used, so that appropriate backup data for the MFP 109 is selected from the many pieces of backup data, and thus a list of the selected backup data can be displayed. The user can select appropriate backup data with ease, if priority information is allocated to the backup data list and the pieces of backup data are arranged in order of priority. The user can also select backup data of interest from the list to display detailed information about the selected backup data. This facilitates identification of backup data in the list. Thus, the present exemplary embodiment provides an information processing system that is excellent in operability in importing backup data into another MFP. Especially, an information processing system capable of preventing an import instruction using erroneous data is provided.

Details of a configuration that realizes the above-described use example will be described.

<Information Processing Apparatus>

Figure 2:
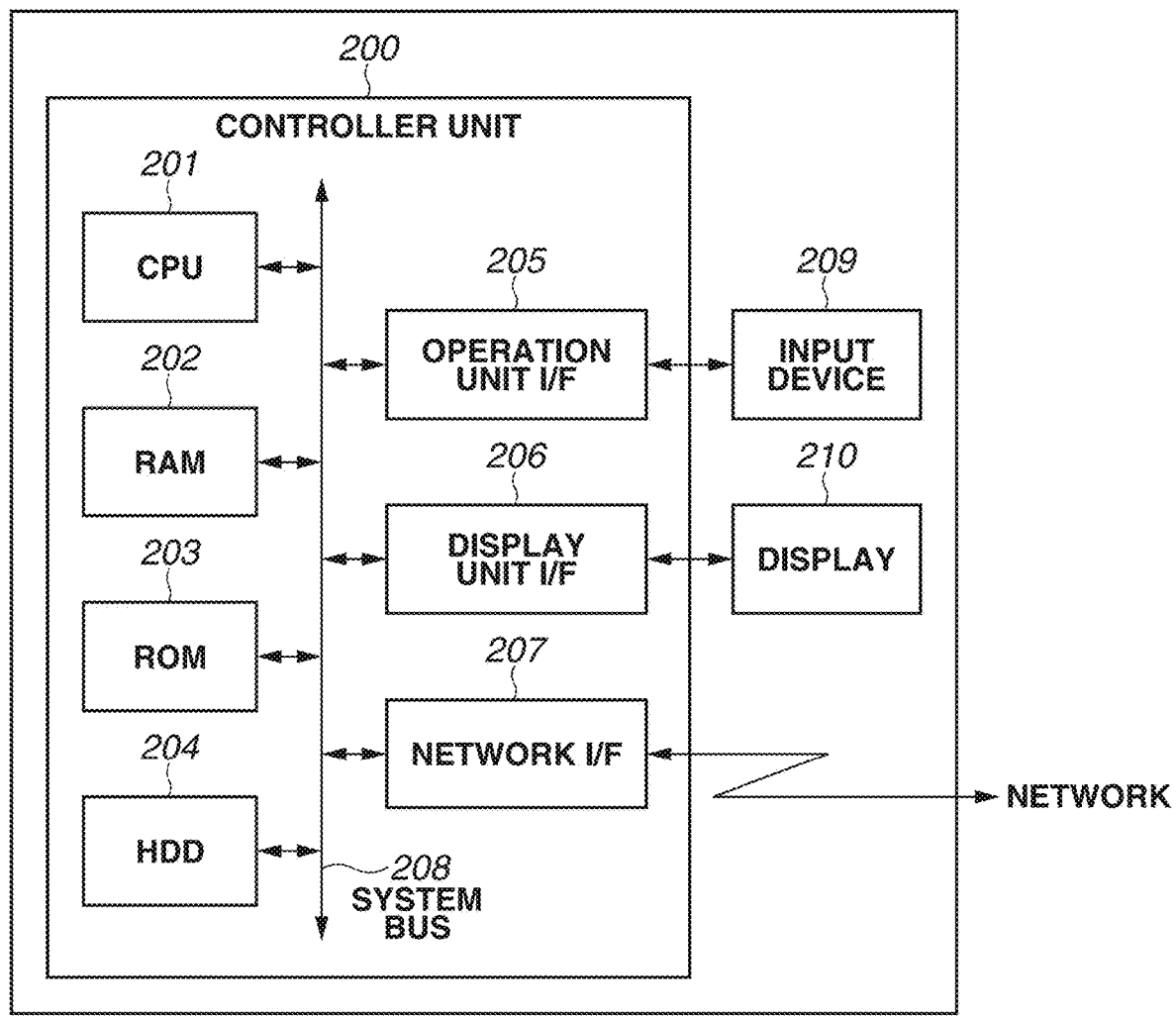
FIG. 2 is a block diagram illustrating a hardware configuration of an information processing apparatus according to one embodiment.

Information processing apparatuses are respectively used as the server (one or more computers) 101 configured to provide a backup service, the terminal 103 of the service provider 102, and the terminal 105 of the client 104. For simplification of description, the information processing apparatuses have a similar configuration in the present exemplary embodiment. FIG. 2 is a block diagram illustrating a hardware configuration of the information processing apparatuses.

Each information processing apparatus includes a controller unit 200, an input device 209, and a display 210.

The controller unit 200 is a control unit configured to perform various types of control on the information processing apparatus. The input device 209 is an input device configured to receive a user input operation. A keyboard or a pointing device (e.g., mouse, touch pad, touch panel, and trackball) is used as the input device 209. The display 210 is a display unit configured to display information.

The controller unit 200 includes a central processing unit (CPU) 201, a random access memory (RAM) 202, a read-only memory (ROM) 203, an operation unit interface (operation unit I/F) 205, a display unit interface (display unit I/F) 206, and a network interface (network I/F) 207. Each of these units is communicably connected via a system bus 208.

The CPU 201 executes a program stored in the ROM 203 and a program, such as an operating system (OS) and application loaded from a HDD 204 to the RAM 202. In a case where the information processing apparatus is the server 101, for example, a program for functioning as a server is executed. In a case where the information processing apparatus is the terminal 103 or 105, for example, a program of a web browser for accessing the server 101 is executed. The CPU 201 executes the program stored on a readable storage medium to thereby function as each processing unit configured to execute a process illustrated in a flowchart described below. The RAM 202 is a main memory of the CPU 201 and functions as a work area. The operation unit I/F 205 controls operational input from the input device 209. The display unit I/F 206 controls the display 210. The network I/F 207 is connected to a network, and controls communication with other devices connected to the network.

Figure 5A:
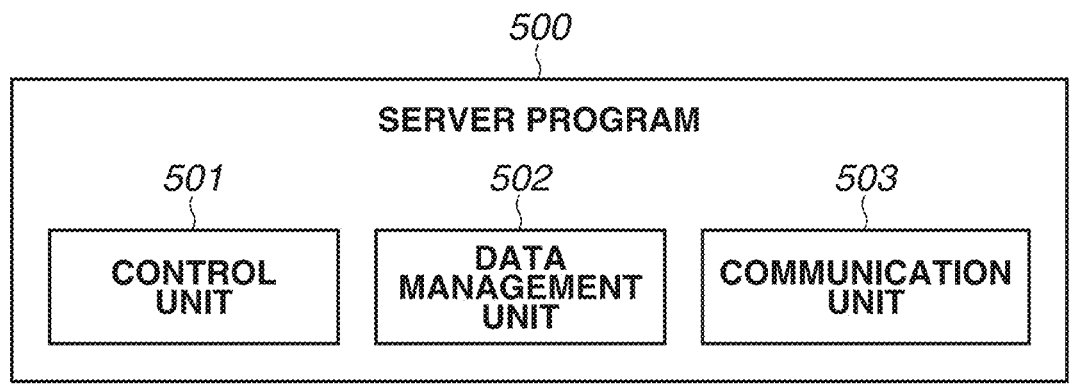
FIGS. 5A, 5B, and 5C are block diagrams illustrating functional configurations of a server, a backup application, and a migration service, respectively, according to one embodiment.

FIG. 5A is a block diagram illustrating a functional configuration of the server 101. A server program 500 includes a control unit 501, a data management unit 502, and a communication unit 503. A program stored in the ROM 203 of the information processing apparatus on which the server program 500 runs is read and written in the RAM 202 and executed by the CPU 201, so that the server program 500 is realized. The control unit 501 is a software module configured to receive various types of processing execution instructions from a website provided by the server program 500 and processing requests from the MFPs 106, 107, 108, and 109, and to execute various types of processing. The data management unit 502 stores data in a database formed in the HDD 204 or a storage service using, for example, a storage apparatus on the network, refers to the data, and reads the data from the database. In a case where the data management unit 502 stores backup data about an MFP, a tenant area for the client having the MFP is prepared on the storage service and data is stored in the client tenant as described above. The communication unit 503 is a software module included in the network I/F 207 and configured to control communication with an external device.

<MFPs>

Figure 4A:
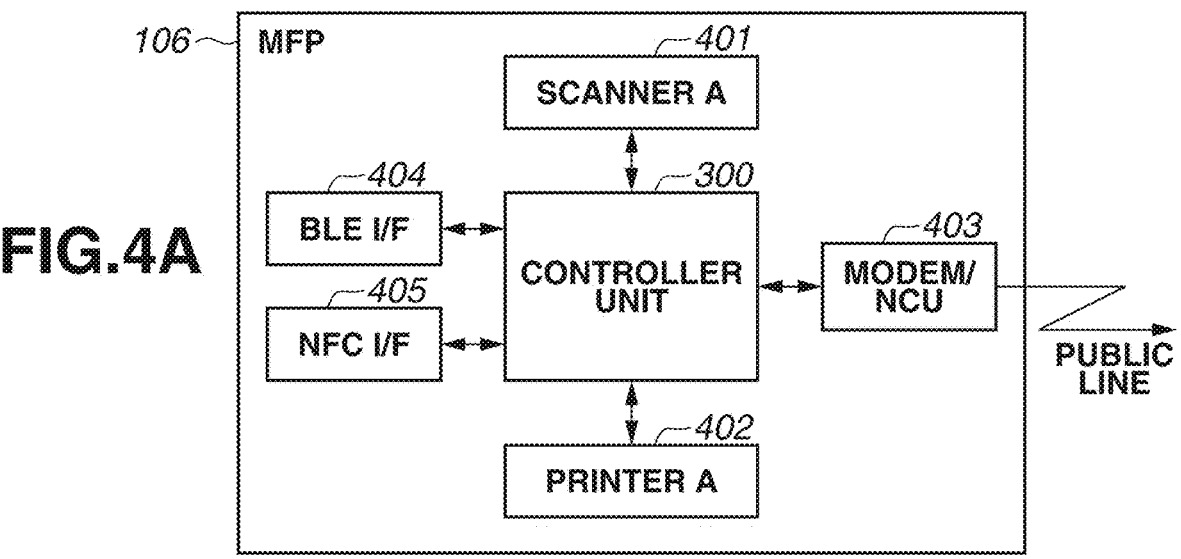
FIG. 4A illustrates a block diagram of a hardware configuration of an MFP 106.
Figure 4B:
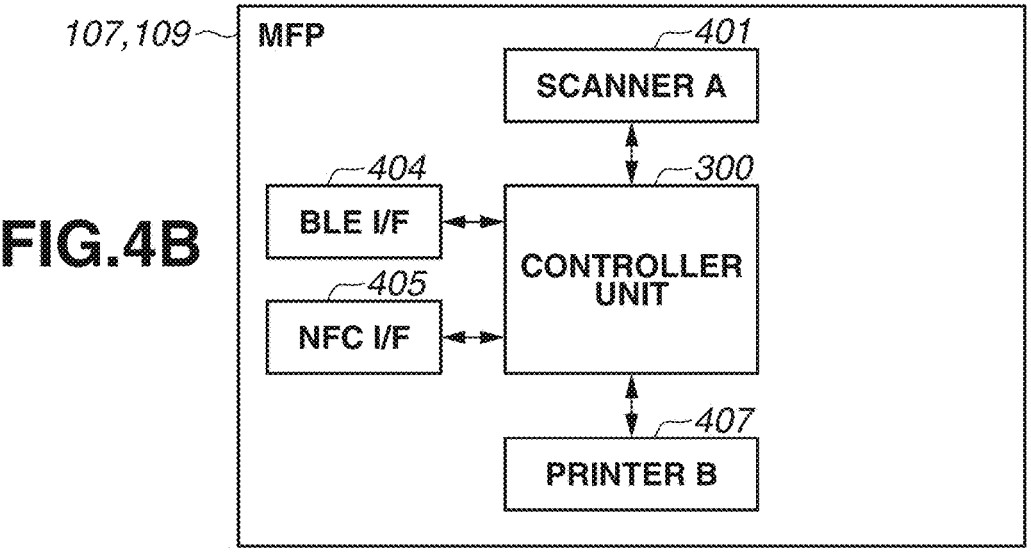
FIG. 4B illustrates a hardware configuration of MFPs 107 and 109.
Figure 4C:
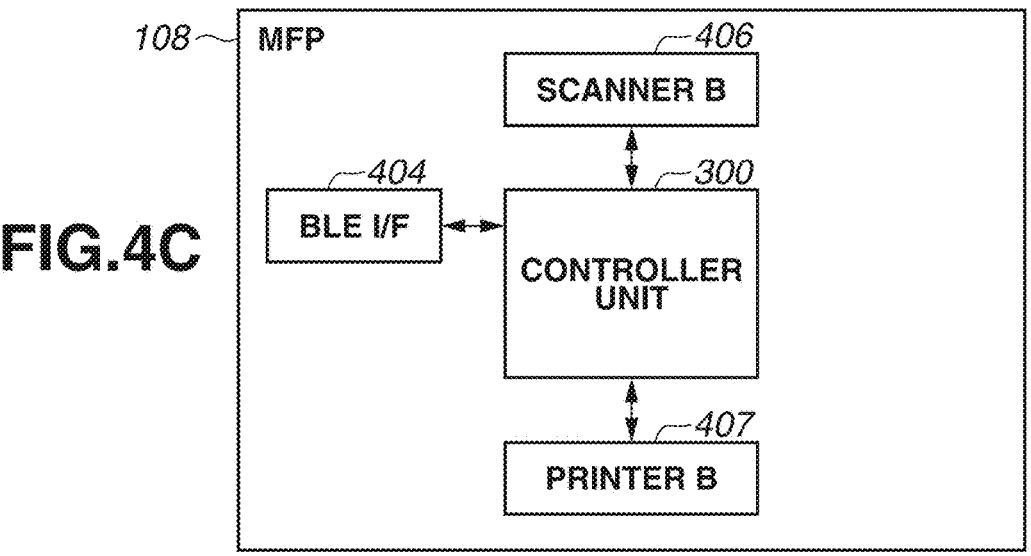
FIG. 4C illustrates a hardware configuration of an MFP 108 according to one embodiment.

The MFPs 106, 107, 108, and 109 are apparatuses that include a controller unit 300 and optional hardware other than the controller unit 300. In the present exemplary embodiment, different combinations of hardware are connected to the controller unit 300 having a common specification so that the MFPs 106, 107, 108, and 109 become diverse. An application configured to execute an additional function in addition to basic functions, such as print and scan functions, can be installed in the MFPs 106, 107, 108, and 109. Thus, the combinations of the functions of the MFPs 106, 107, 108, and 109 are diverse. The MFPs 107 and 109 described herein have a common hardware configuration. FIG. 4A illustrates a hardware configuration of the MFP 106. FIG. 4B illustrates a hardware configuration of the MFPs 107 and 109. FIG. 4C illustrates a hardware configuration of the MFP 108.

A scanner A 401 and a scanner B 406 are image input devices, and are configured to transmit scanned document image data to the controller unit 300 via a device controller I/F.

The scanner A 401 and the scanner B 406 are different scanner devices, and a different combination can be selected depending on MFP specifications. While the scanner A 401 and the scanner B 406 are described herein, a scanner other than the scanner A 401 and the scanner B 406 can be selected in the MFP configurations.

A printer A 402 and a printer B 407 are devices configured to output image data transmitted from the controller unit 300 via the device controller I/F onto a sheet.

The printer A 402 and the printer B 407 are different printer devices, and a different combination can be selected depending on MFP specifications, similar to the above-described scanners.

A modem and network control unit (MODEM/NCU) 403 has a fraction of modulating/demodulating a transmitted signal and a received signal of a facsimile and transmitting a selection signal (e.g., dial pulse or tone dialer) to a public line. The MODEM/NCU 403 also performs a facsimile reception operation by detecting a call signal. A Bluetooth® Low Energy interface 404 (referred to as BLE I/F 404 in FIGS. 4A to 4C) functions as an interface for data communication with an external device using Bluetooth Low Energy. A NFC I/F 405 supports NFC communication standards. The NFC I/F 405 functions as an interface for communication with an external integrated circuit (IC) card or a mobile terminal.

The MODEM/NCU 403, the Bluetooth Low Energy I/F 404, and the NFC I/F 405 are configured such that it is selectable to connect or not connect to the MFPs 106 to 109 as an option. For example, the MFP 108 is different from the MFPs 106, 107, and 109 in that the MFP 108 does not include the NFC I/F 405.

FIG. 3 is a block diagram illustrating a configuration of the controller unit 300 of an MFP. The controller unit 300 includes a CPU 301, a ROM 302, a RAM 303, an HDD 304, a network I/F 305, an operation interface 306, an image processing unit 307, and a device controller I/F 308. These units are communicably connected via a system bus 309.

The CPU 301 functions as a controller that controls the entire MFP. The CPU 301 performs printer/scanner control based on a control program. The control program is stored on, for example, the ROM 302 and the HDD 304. The CPU 301 also executes a backup application and a migration application. The backup application and the migration application are stored on the HDD 304. Besides the backup application, various types of information, such as various MFP setting values, log information, client information, and license information, are stored on the HDD 304. Authentication information for use in communicating with the server 101 and connecting to an appropriate client tenant using the function of the backup application is also stored in the HDD 304.

The RAM 303 is a main memory of the CPU 301 and functions as a work area. The operation interface 306 is an interface for transmitting and receiving a signal to and from an operation device 310. For example, a switch for an operation and a liquid crystal display (LED) are used as the operation device 310. In the present exemplary embodiment, a touch panel that includes a combination of a liquid crystal panel and a touch sensor is used as the operation device 310. The operation device 310 functions as an input unit that receives user-input information and an output unit that outputs information to the user. The image processing unit 307 is a raster image processor (RIP) or a dedicated circuit configured to perform some of image processing such as image correction.

The network I/F 305 is connected to a network and controls communication with another device connected to the network.

Different types and combinations of devices (optional hardware) for each apparatus are connected to the device controller I/F 308. The device controller I/F 308 transmits and receives a signal such as a control signal to and from the connected devices, and performs synchronous/asynchronous conversion on image data.

The MFPs 106, 107, 108, and 109 execute a backup application 511 and a migration application 521.

Figure 5B:
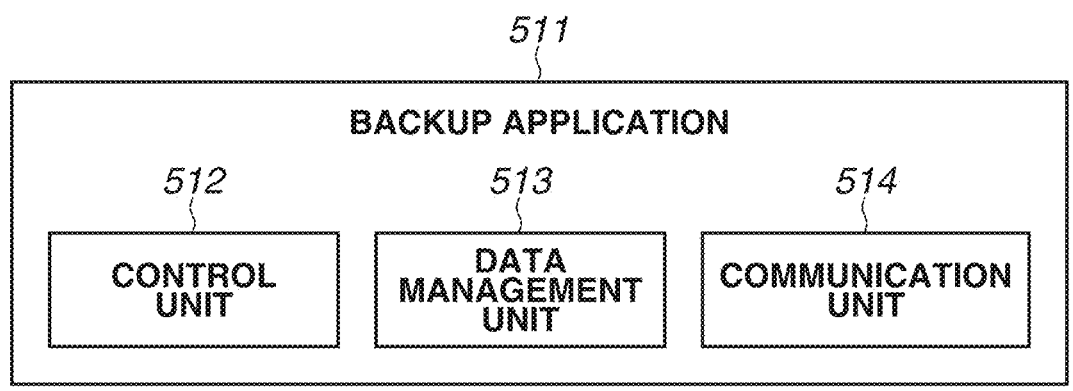

FIG. 5B is a block diagram illustrating a functional configuration of the backup application 511. The backup application 511 includes a control unit 512, a data management unit 513, and a communication unit 514. The control unit 512 is a software module configured to receive instructions to execute various types of processing from the operation device 310, and executes the various types of processing. The data management unit 513 reads data to be backup data from the HDD 304, and restores data acquired from the server 101. The communication unit 514 is a software module configured to control communication with an external device via the network I/F 305.

Figure 5C:
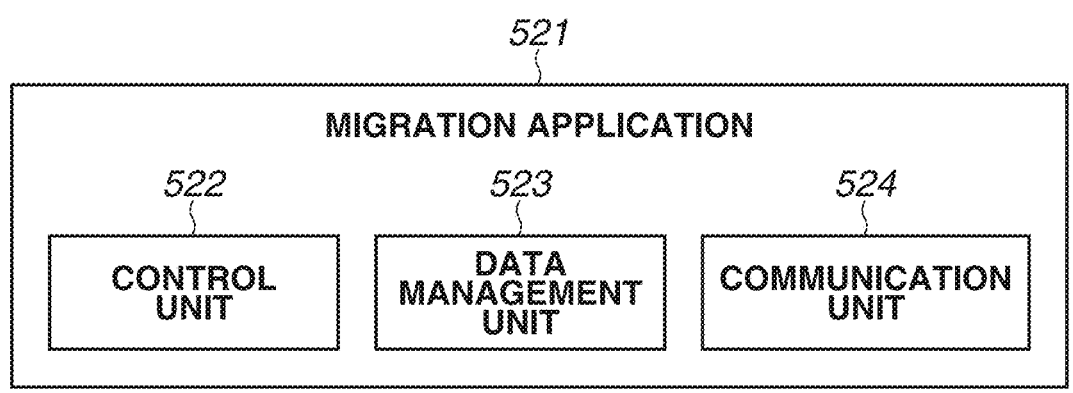

FIG. 5C is a block diagram illustrating a functional configuration of a migration service. The migration application 521 includes a control unit 522, a data management unit 523, and a communication unit 524. The control unit 522 is a software module configured to receive instructions to execute various types of processing from the operation device 310, and executes the various types of processing. The data management unit 513 reads data to be backup data from the HDD 304, and imports data acquired from the server 101 for migration. The communication unit 514 is a software module configured to control communication with an external device via the network OF 305.

<Tenant Information Registration Process>

Figure 6:
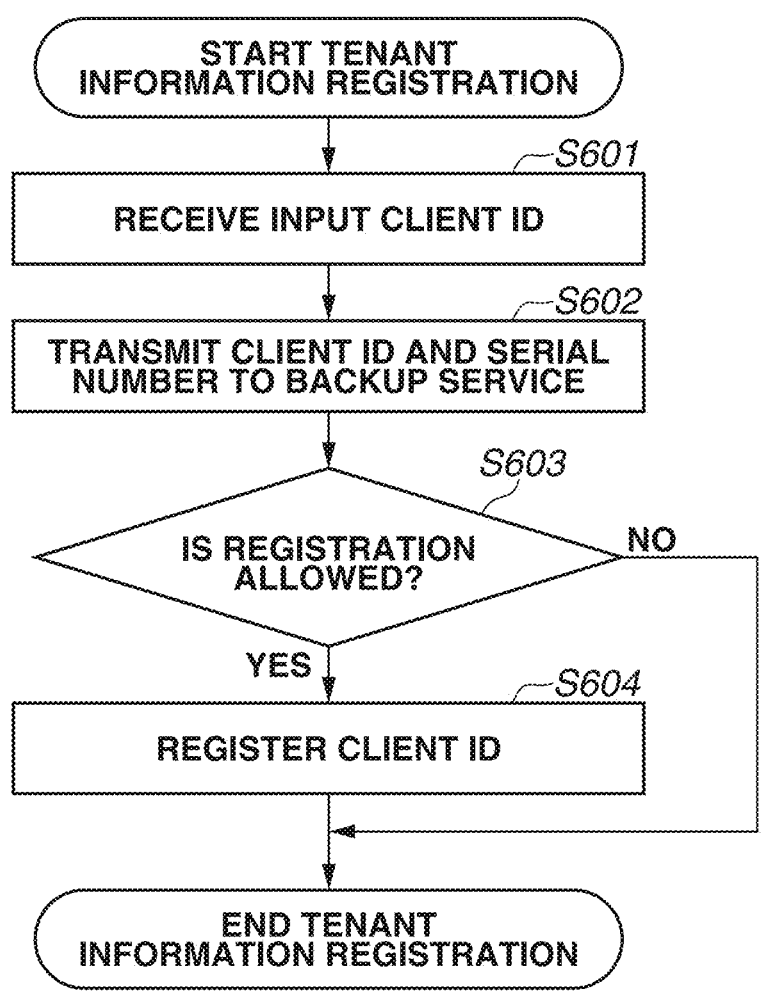
FIG. 6 is a flowchart illustrating a process of registering tenant information according to one embodiment.
Figure 7A:
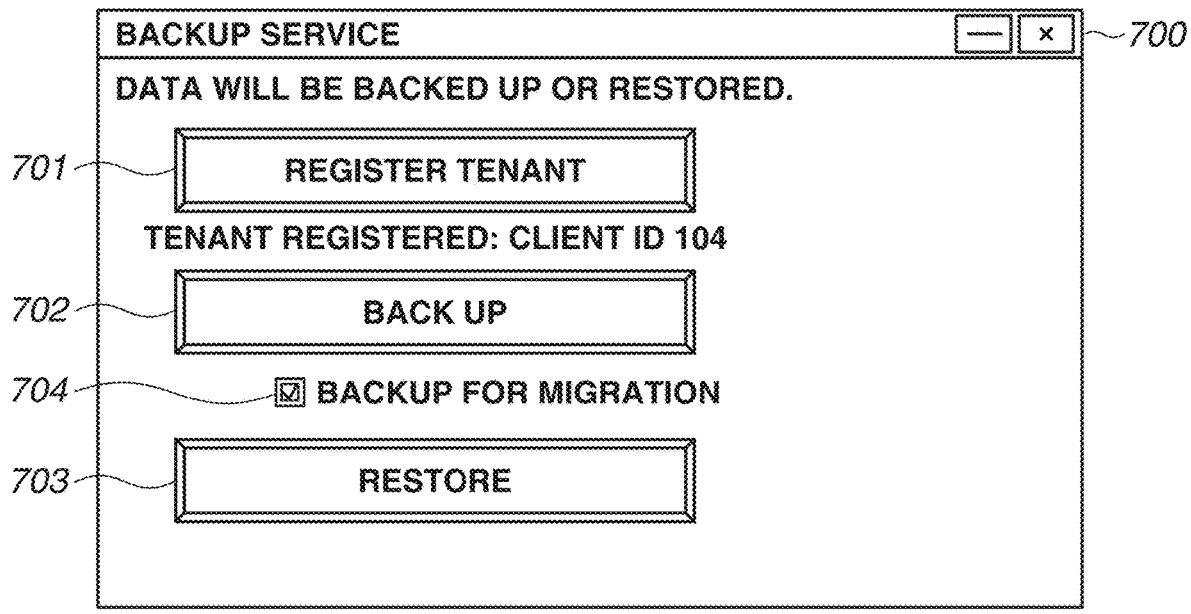
FIGS. 7A and 7B respectively illustrate operation screens of the backup application and a migration application according to one embodiment.
Figure 7B:
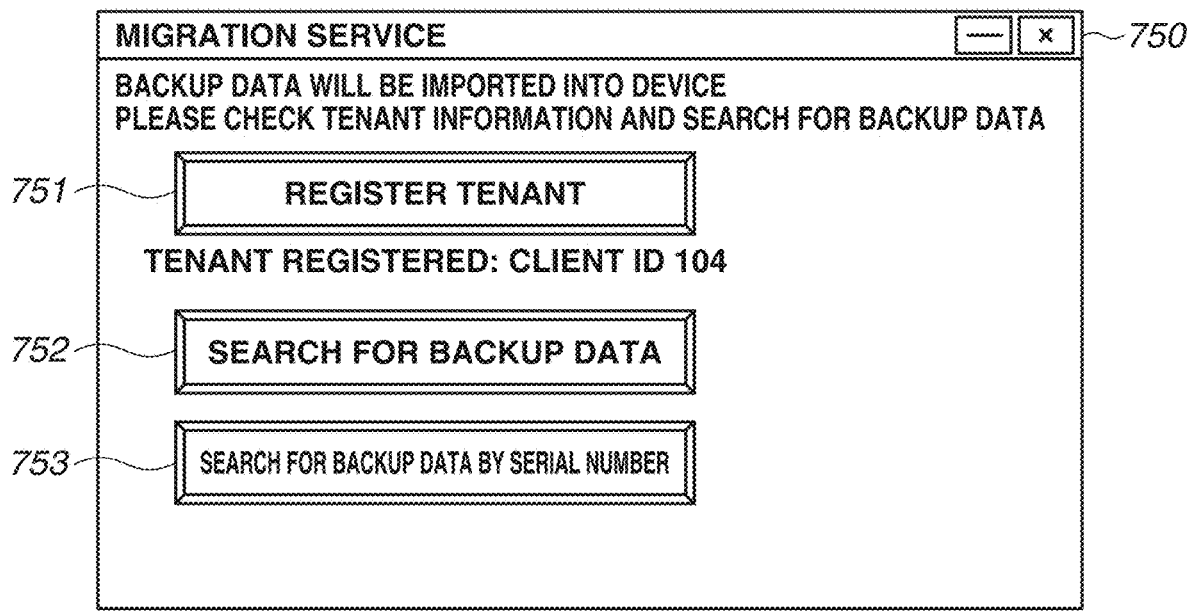

A tenant information registration process as a process for using the system will be described. The tenant information registration process is performed by the backup application 511 and the migration application 521. Thus, the CPU 301 realizes the tenant information registration process by executing a program stored on the ROM 302 or the ROM 302. FIG. 7A illustrates an operation screen of the backup application 511. FIG. 7B illustrates an operation screen of the migration application 521. FIG. 6 is a flowchart illustrating the tenant information registration process.

When the backup application 511 installed in the MFPs 106 to 109 is activated, an operation screen 700 illustrated in FIG. 7A is displayed on the operation device 310. The operation screen 700 includes a tenant registration button 701, a backup button 702, a restore button 703, and a checkbox 704. If the tenant registration button 701 is selected on the operation screen 700, the tenant information registration process starts.

When the migration application 521 installed in the MFPs 106 to 109 is activated, an operation screen 750 illustrated in FIG. 7B is displayed on the operation device 310. The operation screen 750 includes a tenant registration button 751, a backup data search button 752, and a search-by-serial-number button 753. If the tenant registration button 751 is selected on the operation screen 750, the tenant information registration process starts.

In step S601, the CPU 301 receives an input client ID of a client administrator. In step S602, the CPU 301 transmits the received client ID to the server 101. In step S603, the CPU 301 waits for a response regarding a registration result from the server 101 and checks whether the registration is allowed. In a case where the registration is allowed (YES in step S603), the CPU 301 registers the client ID in step S604. In a case where the MFP authentication by the server 101 has not been unsuccessful (NO in step S603), the registration is not allowed and the system cannot be used.

<Backup Process>

After the tenant information registration process is finished, the backup process becomes executable. If the backup button 702 is selected on the operation screen 700, the backup process is executed. In a case where data is backed up as data for migration, the checkbox 704 is selected in advance. In the backup for migration, the data is registered in the server 101 as data to be imported into an MFP that is different from a backup source MFP.

The backup process is realized by the CPU 301 executing a program stored on the ROM 302 or the RAM 303. FIG. 8 is a flowchart illustrating the backup process of the backup application 511.

In step S801, the CPU 301 checks whether tenant information about an apparatus (e.g., MFP 106, 107, 108, or 109) that is executing the application is registered. If tenant information is registered (YES in step S801), the processing proceeds to step S802. In step S802, the CPU 301 checks whether the backup is for migration. In a case where the backup is for migration (YES in step S802), the processing proceeds to step S803. In step S803, the CPU 301 allocates migration information and transmits backup data with the migration information to the server 101. The backup data includes a serial number that identifies the MFP as the backup data transmission source, and configuration/specification information about the MFP. On the other hand, in a case where the backup is not for migration (NO in step S802), the processing proceeds to step S804. In step S804, the CPU 301 does not allocate migration information and transmits backup data to the server 101 without migration information.

The transmitted backup data is registered in the server 101.

<Migration Process (Search by Device Specification)>

A plurality of pieces of backup data registered in the backup process can be used in not only a process for restoring to the self-apparatus that is executed when the restore button 703 is selected but also a process for importing into another apparatus. In the present exemplary embodiment, a case will be described where the migration process is performed on the new MFP 109 in a state where backup data about the existing MFPs 106 to 108 is registered in the server 101.

For example, if the backup data search button 752 is selected on the operation screen 750, an operation screen 1000 as illustrated in FIG. 10A is generated and displayed on the operation device 310. FIG. 10A illustrates an example of a search result of the migration application 521. The operation screen 1000 includes a data list 1001, a device information display button 1002, and an import start button 1003.

The data list 1001 is a list of identification information about displayable backup data among the backup data registered in the server 101. The identification information includes an apparatus-specific serial number, apparatus name, and backup time. The serial number that is the identification information is associated with the apparatus name and backup date/time information. In the present exemplary embodiment, all the backup data in the same tenant can be listed. Information that does not fit in a predetermined screen size can be displayed by scrolling. In the data list 1001, identification information about backup data is listed based on priority information. In the data list 1001, the backup data is numbered in decreasing order of priority (e.g., 1, 2, 3, 4, and 5), and the backup data with higher priority is arranged at a higher position in the screen.

A method of determining the priority will be described below. The symbol "o" in the section "Migration" indicates that migration information is allocated to the backup data. In this way, backup data that is designated as backup data for migration is discriminated from other backup data. The data list 1001 can designate one piece of identification information among the plurality of pieces of identification information, and set a state of the one piece of identification to a selected state (selectable).

The device information display button 1002 is a button for checking detailed information about the backup data whose selected identification information has been set to the selected state. If the device information display button 1002 is selected, an operation screen 1120 as illustrated in FIG. 10C is displayed on the operation device 310. The operation screen 1120 is a screen that shows detailed information about the MFP for which the backup data is generated. On the operation screen 1120, image data 1021 and information 1022 are arranged. The image data 1021 shows an apparatus name and an outer view of the MFP. The information 1022 specifies an optional hardware configuration of the MFP, such as a scanner, printer, and facsimile. The information 1022 also specifies whether there is an extended application that is installed as an additional function. The screen returns to the operation screen 1000 if an OK button 1023 is selected.

The import start button 1003 is a button for inputting an instruction to start importing backup data. If the import start button 1003 is selected in a state where identification information about backup data in the data list 1001 is selected, importing processing is executed based on the backup data that corresponds to the identification information in the selected state.

A process following the selection of the backup data search button 752 will be described with reference to FIG. 9. FIG. 9 is a flowchart illustrating a migration process (search by device specification) of the migration application 521. The migration process (device specification search) is realized by the CPU 301 executing a program stored in the ROM 302 or the RAM 303.

In step S901, the CPU 301 judges whether tenant information is registered. In a case where tenant information is registered (YES in step S901), the processing proceeds to step S902. In step S902, the CPU 301 transmits the device specification of the self-apparatus to the server 101, and requests acquisition of a list of backup data for migration. In a case where tenant information is not registered (NO in step S901), the migration process ends. In step S903, the CPU 301 judges whether backup data is received from the server 101. In a case where backup data is successfully received (YES in step S903), the processing proceeds to step S904. In step S904, the CPU 301 displays a backup data list transmitted from the server 101 according to priority information. In a case where backup data is not received (NO in step S903), the migration process ends. In step S905, the CPU 301 determines whether acquisition of information about the MFP that generated the backup data is requested. In a case where acquisition is requested in step S905 (YES in step S905), the processing proceeds to step S906. In step S906, the CPU 301 requests detailed information about backup data from the server 101, and displays acquired MFP information on the operation device 310. In a case where acquisition is not requested in step S905 (NO in step S905), the processing proceeds to step S907. In step S907, the CPU 301 checks whether an import instruction is issued. In a case where no import instruction is issued (NO in step S907), the processing returns to step S904, and the CPU 301 waits for a user operation. In a case where an import instruction is issued (YES in step S907), the processing proceeds to step S908. In step S908, the CPU 301 requests the designated backup data from the server 101 and executes importing processing based on the received backup data.

Figure 12:
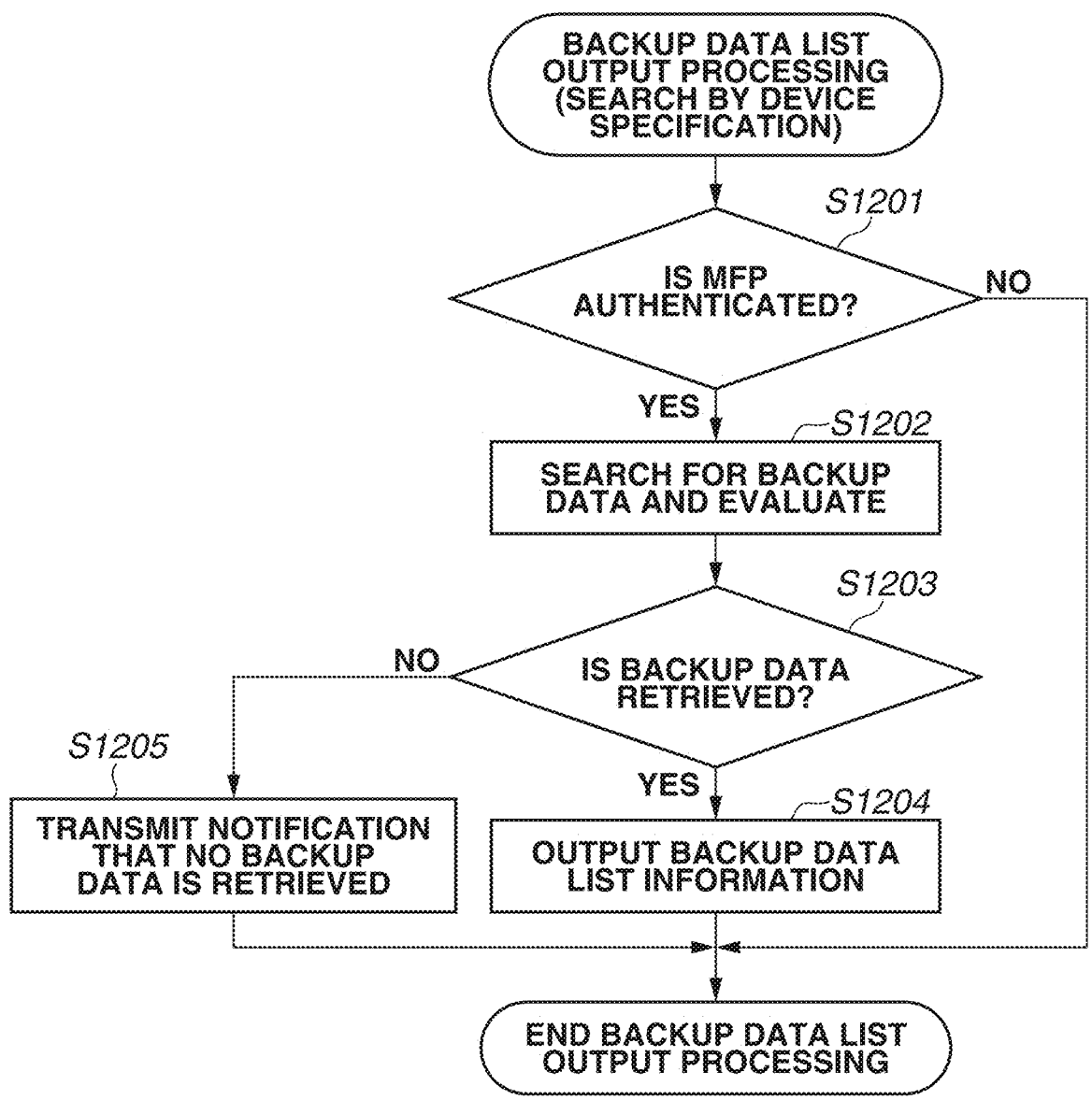
FIG. 12 is a flowchart illustrating a backup data list output process (search by device specification) of the server according to one embodiment.

Next, a process that is performed by the server 101 between steps S902 and S903 will be described in detail. FIG. 12 is a flowchart illustrating a backup data list output process (search by device specification) by the server 101. The backup data list output process (device specification search) is realized by the CPU 201 executing a program stored on the ROM 203 or the RAM 202.

In step S1201, if the migration application 521 of the MFP receives the request output in step S902, the CPU 201 checks whether the request source MFP is an authenticated MFP with respect to the tenant. If the request source MFP is an authenticated MFP (YES in step S1201), the processing proceeds to step S1202. In step S1202, the CPU 201 responds to the request for acquisition of a list of backup data for migration. In a case where the request is from an unauthenticated MFP (NO in step S1201) the process ends. In step S1202, the CPU 201 searches for backup data that is associated with device information similar to the device specification transmitted in step S902.

The search method will be described with reference to Tables 1 to 3.

TABLE 1

| Option Type | MFP Specification Data ID | Value |
|---|---|---|
| NFC I/F | device_settings.nfc_available | Yes |
| Bluetooth Low Energy I/F | device_settings.ble_available | No |
| MODEM/NCU | device_settings.fax_modem_available | Yes |
| Printer | device_settings.printer_type | TYPE-P2 |
| Scanner | device_settings.scanner_type | TYPE-S1 |
| Extended Application 1 | lisence_settings.application_1 | Enable |
| Extended Application 2 | lisence_settings.application_2 | Disable |
| Extended Application 3 | lisence_settings.application_3 | Disable |

TABLE 2

| Option Type | MFP Specification Data ID | Backup Value |
|---|---|---|
| NFC I/F | device_settings.nfc_available | Yes |
| Bluetooth Low Energy I/F | device_settings.ble_available | Yes |

TABLE 2-continued

| Option Type | MFP Specification Data ID | Backup Value |
|---|---|---|
| MODEM/NCU | device_settings.fax_modem_available | No |
| Printer | device_settings.printer_type | TYPE-P2 |
| Scanner | device_settings.scanner_type | TYPE-S2Z |
| Extended Application 1 | lisence_settings.application_1 | Enable |
| Extended Application 2 | lisence_settings.application_2 | Disable |
| Extended Application 3 | lisence_settings.application_3 | Enable |

Tables 1 and 2 are examples of device specification data. Table 1 includes device specification data about the MFP that requests backup data. Option information about the MFP that requests backup data is described in Table 1. An MFP specification data ID is an ID that specifies an option type. The optional configuration of the MFP is specified by a value that corresponds to the MFP specification data ID. For example, in a case where the value of "device_settings.nfc_available" is "yes", the MFP includes an NFC I/F. In a case where the value of "device_settings.printer_type" is "TYPE-P2", a printer "TYPE-P2" is mounted on the MFP.

Table 2 illustrates an example of device specification data about the MFP from which backup data is acquired.

The backup data managed by the server 101 includes device specification data as described in Table 1. Option information about the MFP for which backup data is generated is managed. Table 2 is to be viewed similarly to Table 1.

migration application 521. In a case where backup data is retrieved (YES in step S1203), the processing proceeds to step S1204. In step S1204, the CPU 201 transmits backup data list information containing priority information and allocation information about migration information to the migration application 521.

<Migration Processing (Search by Serial Number)>

In the present exemplary embodiment, a migration process (search by serial number) can also be executed besides the migration process (search by device specification). In the migration process (search by serial number), a backup data search is performed based on a serial number. Since a serial number is specific identification information for each MFP, desired backup data is efficiently extracted. When the search-by-serial-number button 753 is selected on the operation screen 750, a screen (not illustrated) for inputting a serial number is displayed. When a serial number is input and then a search start instruction is input on the screen, an

TABLE 3

| Option Type | MFP Specification Data ID | Value | Backup Value | Coefficient | Evaluation Point |
|---|---|---|---|---|---|
| NFC I/F | device_settings.nfc_available | Yes | Yes | 1 | 1 |
| Bluetooth Low Energy I/F | device_settings.ble_available | No | Yes | 1 | 0 |
| MODEM/NCU | device_settings.fax_modem_available | Yes | No | 2 | 0 |
| Printer | device_settings.printer_type | TYPE-P2 | TYPE-P2 | 5 | 5 |
| Scanner | device_settings.scanner_type | TYPE-S1 | TYPE-S2Z | 3 | 0 |
| Extended Application 1 | lisence_settings.application_1 | Enable | Enable | 1 | 1 |
| Extended Application 2 | lisence_settings.application_2 | Disable | Disable | 1 | 1 |
| Extended Application 3 | lisence_settings.application_3 | Disable | Enable | 1 | 0 |
| | Total | | | | 8 |
| | Migration Information | | Allocated | 7 | 7 |
| | Total Evaluation Point | | | | 15 |

Table 3 shows a method of evaluating backup data in the search in step S1202. There is a coefficient for each option type in the device specification in Tables 1 and 2, and an evaluation point is calculated based on the values and the coefficients of the option types. In Table 3, the values corresponding to "NFC I/F", "printer", "extended application 1", and "extended application 2" match, and the total of the evaluation points is eight. In a case where migration information is allocated when the backup data is generated, seven is added to the evaluation point, and thus the resulting evaluation point becomes fifteen.

The CPU 201 performs the above-described evaluation point calculation on the plurality of pieces of backup data managed in the tenant, and calculates evaluation points. The CPU 201 then sets a priority to the backup data in decreasing order of the evaluation point. In step S1203, the CPU 201 determines whether backup data is retrieved. In a case where no backup data is retrieved (NO in step S1203), the processing proceeds to step S1205. In step S1205, the CPU 201 transmits a notification that no backup data is retrieved to the operation screen 1010 as illustrated in FIG. 10B is displayed on the operation device 310. FIG. 10B illustrates an example of a search result of the migration application 521. The operation screen 1010 includes the data list 1011, the device information display button 1002, and the import start button 1003.

A data list 1011 is a list of identification information about backup data having the matching serial number among the backup data registered in the server 101. The identification information uses an apparatus-specific serial number, apparatus name, and backup time. Information that does not fit in a predetermined screen size can be displayed by scrolling. In the data list 1011, identification information about backup data is arranged based on the priority information. In the data list 1011, the backup data is numbered in decreasing order of priority (e.g., 1, 2, 3, 4, and 5), and the backup data with higher priority is arranged at a higher position in the screen. A method of determining the priority will be described below. The symbol "o" in the section "Migration" indicates that migration information is allocated to the backup data. One of the plurality of pieces of identification information in the data list 1011 can be designated and changed to a selected state. In the present exemplary embodiment, a plurality of pieces of backup data can be generated in a single apparatus. Thus, even in the case where backup data is extracted using a serial number, identification information about a plurality of pieces of backup data may be displayed as illustrated in FIG. 10B.

Figure 11:
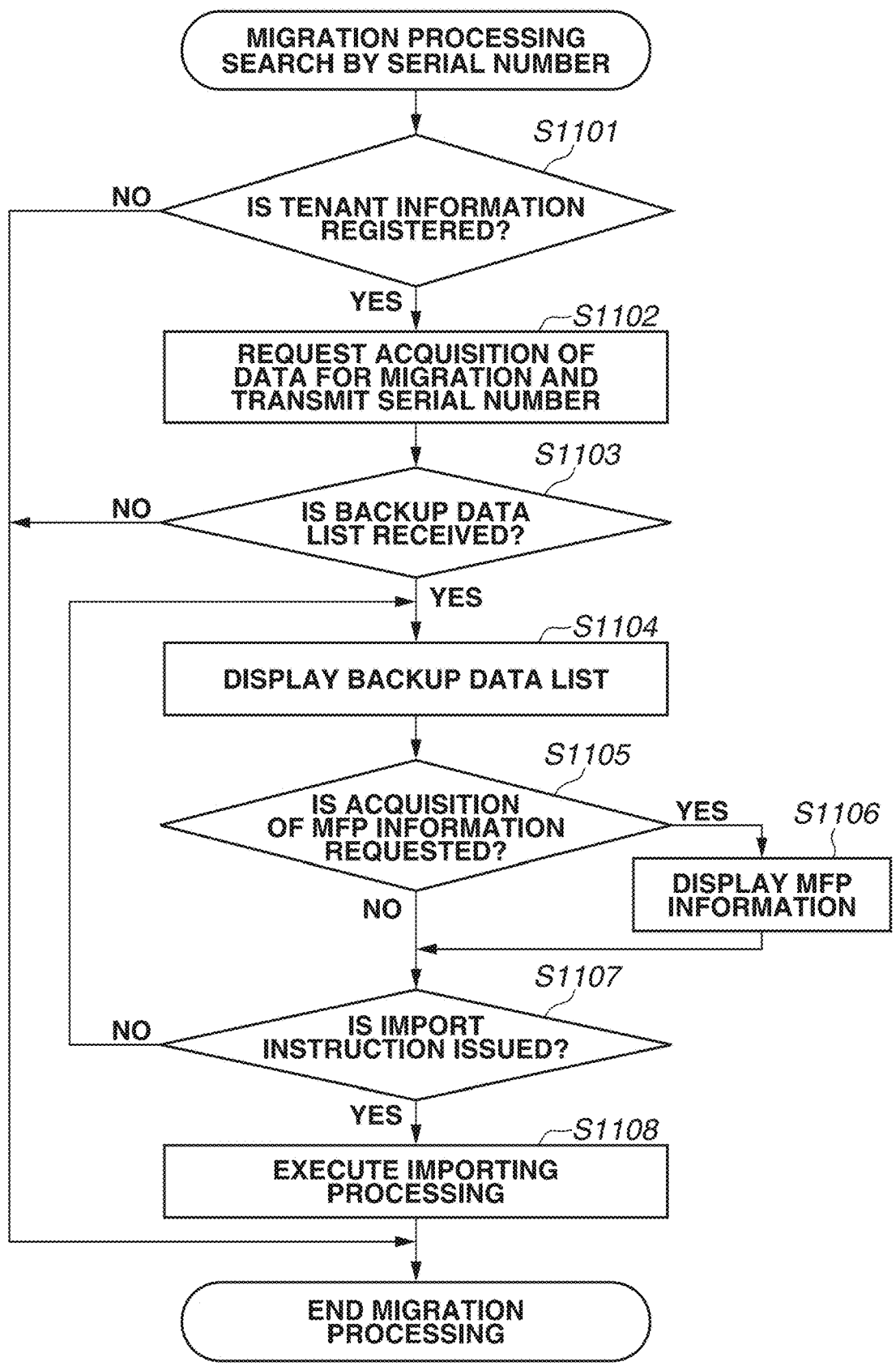
FIG. 11 is a flowchart illustrating a migration process (search by serial number) of the migration application according to one embodiment.

Since the device information display button 1002 and the import start button 1003 are similar to those in FIG. 10A, description of the buttons is omitted. A process following the selection of the search-by-serial-number button 753 will be described with reference to FIG. 11. FIG. 11 is a flowchart illustrating a migration process (search by serial number) of the migration application 521. The migration process (search by serial number) is realized by the CPU 301 executing a program stored on the ROM 302 or the RAM 303. Since steps S1101 and S1105 to S1108 are similar to steps S901 and S1105 to S1108, description thereof is omitted.

In a case where tenant information is registered (YES in step S1101), the processing proceeds to step S1102. In step S1102, the CPU 301 transmits a user-input serial number to the server 101, and requests acquisition of a backup data list. In step S1103, the CPU 301 determines whether backup data is received from the server 101. In a case where backup data is successfully received (YES in step S1103), the processing proceeds to step S1104. In step S1104, the CPU 301 displays the backup data list transmitted from the server 101 according to priority information. In a case where backup data is not received (NO in step S1103), the migration process ends.

Figure 13:
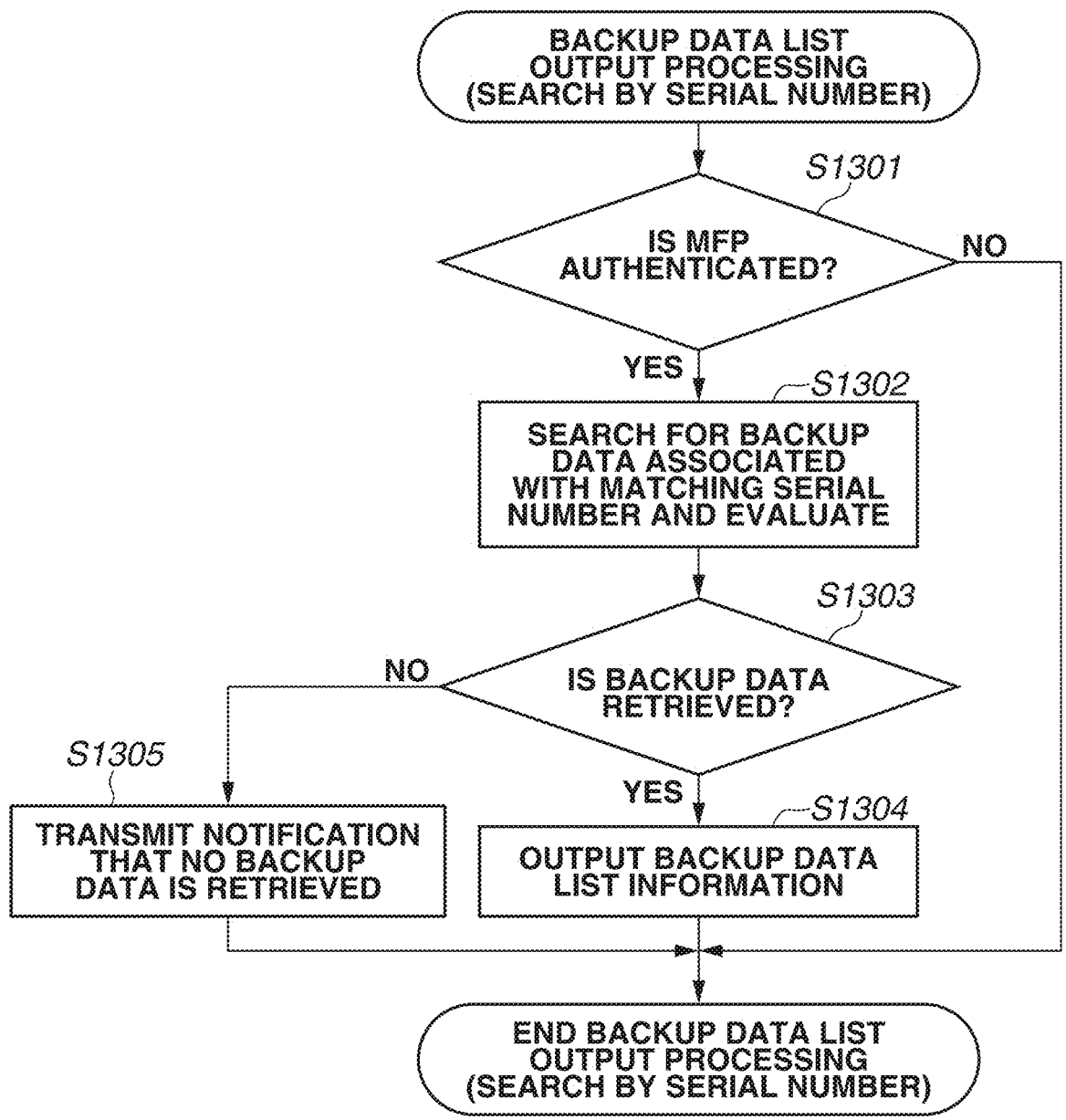
FIG. 13 is a flowchart illustrating a backup data list output process (search by serial number) of the server according to one embodiment.

Next, a process performed by the server 101 between steps S1102 and S1103 will be described in detail. FIG. 13 is a flowchart illustrating a backup data list output process (search by serial number) performed by the server 101. The backup data list output process (search by serial number) is realized by the CPU 201 executing a program stored on the ROM 203 or the RAM 202.

If the request output from the migration application 521 of the MFP in step S902 is received, in step S1301, the CPU 201 checks whether the request source MFP is an authenticated MFP with respect to the tenant. If the request source MFP is an authenticated MFP (YES in step S1301), the processing proceeds to step S1302 to respond to the request for acquisition of a backup data list. In a case where the request is from an unauthenticated MFP (NO in step S1301), the process ends. In step S1302, the CPU 201 searches for backup data associated with a serial number that matches the serial number transmitted in step S1102. In step S1303, the CPU 201 judges whether backup data is retrieved. In a case where no backup data is retrieved (NO in step S1303), the processing proceeds to step S1305. In step S1305, the CPU 201 transmits, to the migration application 521, a notification that no backup data is retrieved. In a case where backup data is retrieved (YES in step S1303), especially in a case where a plurality of pieces of backup data is retrieved, the CPU 201 calculates an evaluation point of each piece of backup data extracted by serial number. The CPU 201 then sets a priority to the backup data in decreasing order of the evaluation point. The pieces of backup data of the same serial number are prioritized because a configuration changes over time. For example, removal or attachment of an external Bluetooth Low Energy device changes the presence or absence of the Bluetooth Low Energy device. Further, installation or uninstallation of an extended application changes the presence or absence of the application function. Thus, it is desirable to perform evaluation using a device specification even in a case where backup data extraction is performed using a serial number. A high priority is set to backup data to which migration information is allocated. The CPU 201 transmits backup data list information including priority information and allocation information about migration information to the migration application 521.

<Remarks>

As described above, according to the present exemplary embodiment, data that is backed up by a single apparatus can be imported into another apparatus. Identification information about backup data can also be displayed based on priority on the screen for selecting backup data to be imported. Information that indicates that the backup data is suitable for importing can also be arranged on a screen for selecting backup data to be imported. The number of pieces of backup data to be listed can be reduced by using a serial number. Therefore, the system according to the present exemplary embodiment provides a user interface that is excellent in operability.

It should be noted that the above-described exemplary embodiment is not intended to limit the scope of the present invention and that various modifications (including an organic combination of exemplary embodiments) are possible within the spirit of the invention and are not to be excluded from the scope of the invention. That is to say, every combination of the above-described exemplary embodiment and a modified example thereof is encompassed within the scope of the invention.

The present disclosure is applicable to a system consisting of a plurality of devices and to an apparatus consisting of a single device.

The exemplary embodiment employs the evaluation method that calculates an evaluation point based on whether each option matches or does not match and based on the coefficients. Alternatively, any other evaluation method can be used. In such a method, an evaluation point with respect to a possible value and an evaluation point with respect to a possible backup value are preset, and a root-mean-square value of the difference between the preset evaluation points is calculated.

Although the priority level is specified by the display order in the exemplary embodiment as illustrated in FIGS. 10A and 10B, the priority can be specified by another method, for example, by changing a color and/or display size on the screen of the operation device 310.

Although the symbol "o" is used to indicate whether attached migration information is allocated in the exemplary embodiment, a message or keyword that is left by the user at the time of backup for migration can be displayed. For example, a text input form can be provided on the operation screen 700 so that the user can leave a message that is appropriate for the purpose of use, such as "For Department A Relocation".

In the exemplary embodiment, the backup data evaluation and the priority allocation are performed by the server 101. Alternatively, the backup data evaluation and the priority allocation can be performed by the MFP. In this case, a list information request is issued without transmitting device specification information in step S1412. In step S1413, the server 101 associates every piece of stored backup data with device specification information. The generated information is then transmitted to the MFP. The MFP performs evaluation and priority determination based on the received information. Alternatively, the server 101 alone may perform only the evaluation, and the MFP may perform the priority determination.

In the exemplary embodiment, a request for configuration information about a backup source apparatus is transmitted to the server 101 when the device information display button 1002 is selected. Alternatively, configuration information about a backup source apparatus may be received together with the list information in step S1414.

In the exemplary embodiment, a list of all the backup data available for use is output to the MFP in step S1204. Alternatively, only a list of a part of the pieces of backup data from a search result may be transmitted to the MFP. For example, only the backup data with an evaluation result that is greater than or equal to a predetermined evaluation value may be transmitted as list information to the MFP.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068845, filed Mar. 29, 2019, which is hereby incorporated by reference herein in its entirety.

What is claimed is:

1. An information processing system comprising:
a first information processing apparatus of one or more information processing apparatuses, and
a server configured to manage a plurality of pieces of backup data about the one or more information processing apparatuses,
wherein the first information processing apparatus is configured to communicate with the server, and comprises:
a display configured to display information; and
at least one controller configured to:
transmit information about the first information processing apparatus to the server; and
cause the display to display a screen via which backup data to be imported to the first information processing apparatuses is to be designated, and
wherein the server comprises at least one controller configured to
acquire, based on the transmitted information about the first information processing apparatus, identification information regarding one or more pieces of backup data of the managed plurality of pieces of backup data, the one or more pieces of backup data including backup data about a second information processing apparatus different from the first information processing apparatus, and
transmit the identification information regarding the one or more pieces of backup data to the first information processing apparatus,
wherein the first information processing apparatus displays, on the screen, information based on the identification information transmitted by the server, the displayed information including a list of the one or more pieces of backup data, the list to be used to designate first backup data to be imported to the first information processing apparatus,
wherein the list of the one or more pieces of backup data is arranged such that items in the list appear in a prioritized order that is determined based on features of the one or more pieces of backup data and of the information about the first information processing apparatus.

2. The information processing system according to claim 1, wherein each of the plurality of pieces of backup data is associated with configuration information about a backup source apparatus.

3. The information processing system according to claim 1, wherein the screen is a screen on which recommended backup data is distinguishable from other backup data.

4. The information processing system according to claim 1, wherein the screen is a screen on which a name of a backup source apparatus is arranged in association with the identification information about the one or more pieces of backup data.

5. The information processing system according to claim 1, wherein the screen is a screen on which backup date/time information is arranged in association with the identification information about the one or more pieces of backup data.

6. The information processing system according to claim 1, wherein the screen is a screen via which an instruction to display information about a backup source apparatus corresponding to the designated backup data is to be input.

7. The information processing system according to claim 1, wherein information about a backup source apparatus includes at least configuration information about the backup source apparatus.

8. The information processing system according to claim 1, wherein information about a backup source apparatus includes at least a view illustrating a configuration of the backup source apparatus.

9. The information processing system according to claim 1, wherein the backup data includes setting-related information about at least one of a print-related setting, a scan-related setting, a facsimile-related setting, a power-related setting, a sheet-related setting, a communication-related setting, a display-related setting, a web browser-related setting, an address book-related setting, and a user-related setting.

10. The information processing system according to claim 1,
wherein upon the first backup data listed on the backup data list being designated for import to the first information processing apparatus, another screen is displayed, the another screen containing a selectable object that can be used to obtain more detailed information about the designated first backup data.

11. An information processing method for an information processing system that includes a server configured to manage a plurality of pieces of backup data about one or more information processing apparatuses, and a first information processing apparatus configured to communicate with the server and including a display configured to display information, the information processing method comprising:
transmitting, from the first information processing apparatus, information about the first information processing apparatus to the server;
causing the display of the first information processing apparatus to display a screen via which backup data to be imported to the first information processing apparatus is to be designated;
acquiring, at the server, based on the transmitted information about the first information processing apparatus, identification information regarding one or more pieces of backup data from among the managed plurality of pieces of backup data, the one or more pieces of backup data including backup data about a second information processing apparatus different from the first information processing apparatus, and
transmitting, from the server, the identification information regarding the one or more pieces of backup data to the first information processing apparatus,
wherein the first information processing apparatus displays, on the screen, information based on the identification information transmitted by the server, the displayed information including a list of the one or more pieces of backup data, the list to be used to designate first backup data to be imported to the first information processing apparatus,
wherein the list of the one or more pieces of backup data is arranged such that items in the list appear in a prioritized order that is determined based on features of the one or more pieces of backup data and of the information about the first information processing apparatus.

12. The information processing method according to claim 11, wherein each of the plurality of pieces of backup data is associated with configuration information about a backup source apparatus.

13. The information processing method according to claim 11, wherein the screen is a screen on which recommended backup data is distinguishable from other backup data.

14. The information processing method according to claim 11, wherein the screen is a screen on which a product name of a backup source apparatus is arranged in association with the backup data.

15. The information processing method according to claim 11, wherein the screen is a screen on which backup date/time information is arranged in association with the backup data.

16. The information processing method according to claim 11, wherein the screen is a screen via which an instruction to display information about a backup source apparatus corresponding to the designated backup data is to be input.

17. The information processing method according to claim 16, wherein the information about the backup source apparatus includes at least configuration information about the backup source apparatus.

18. The information processing method according to claim 16, wherein the information about the backup source apparatus includes at least a view illustrating a configuration of the backup source apparatus.

19. The information processing method according to claim 11, wherein the backup data includes setting-related information about at least one of a print-related setting, a scan-related setting, a facsimile-related setting, a power-related setting, a sheet-related setting, a communication-related setting, a display-related setting, a web browser-related setting, an address book-related setting, and a user-related setting.

20. The information processing method according to claim 11,
wherein upon the first backup data listed on the backup data list being designated for import to the first information processing apparatus, another screen is displayed, the another screen containing a selectable object that can be used to obtain more detailed information about the designated first backup data.

21. A first information processing apparatus configured to communicate with a server, the server configured to manage a plurality of pieces of backup data about one or more information processing apparatuses, the first information processing apparatus comprising:
a display configured to display information; and
at least one controller configured to:
transmit information about the information processing apparatus to the server;
acquire identification information regarding one or more pieces of backup data from among the managed plurality of pieces of backup data, from the server, wherein the one or more pieces of backup data includes backup data about a second information processing apparatus of the one or more information processing apparatuses different from the first information processing apparatus; and
cause the display to display a screen via which backup data to be imported to the first information processing apparatus is to be designated,
wherein the first information processing apparatus displays, on the screen, information based on the identification information transmitted by the server, and the displayed information including a list of the one or more pieces of backup data, the list to be used to designate first backup data to be imported to the first information processing apparatus,
wherein the list of the one or more pieces of backup data is arranged such that items in the list appear in a prioritized order that is determined based on features of the one or more pieces of backup data and of the information about the first information processing apparatus.

22. The information processing apparatus according to claim 21,
wherein upon the first backup data listed on the backup data list being designated for import to the first information processing apparatus, another screen is displayed, the another screen containing a selectable object that can be used to obtain more detailed information about the designated first backup data.

* * * * *